United States Patent [19]

Voth et al.

[11] 4,034,543
[45] July 12, 1977

[54] CROP DENSITY SENSING MECHANISM FOR BALER LOADING APPARATUS

[75] Inventors: Harold William Voth, Newton; Allen Andrew White, Peabody, both of Kans.

[73] Assignee: Hesston Corporation, Hesston, Kans.

[21] Appl. No.: 675,475

[22] Filed: Apr. 9, 1976

[51] Int. Cl.² ........................................ A01D 39/00
[52] U.S. Cl. ................................. 56/341; 100/50; 100/189
[58] Field of Search ..................... 56/341, 343, 344; 100/188, 189, 50

[56] References Cited

U.S. PATENT DOCUMENTS

| | | | |
|---|---|---|---|
| 2,684,802 | 7/1954 | Rothwell | 100/50 |
| 3,552,109 | 1/1971 | Murray et al. | 56/344 |

Primary Examiner—J.N. Eskovitz
Attorney, Agent, or Firm—Schmidt, Johnson, Hovey & Williams

[57] ABSTRACT

If the next charge to be stuffed into the baling chamber has not yet reached the desired size and density by the time the stuffing fork and compacting plunger are ready to begin their next operating cycles, the plunger and the fork are temporarily deactivated until the charge reaches full size and density. Thereupon, the fork stuffs the entire charge into the baling chamber in a single cycle of operation for compaction by the plunger. The baler is loaded from the bottom of the baling chamber through an upwardly curved duct that serves both as an accumulating chamber and as a pre-compression area into which the charge is progressively packed by a rotating, retractable finger drum at the lower end of the duct. Actuation of the plunger and stuffing fork occurs automatically in response to obtaining the predetermined density of the accumulated charge as sensed by a pressure-sensitive device located at the lower end of the loading duct slightly downstream from the packing drum.

14 Claims, 9 Drawing Figures

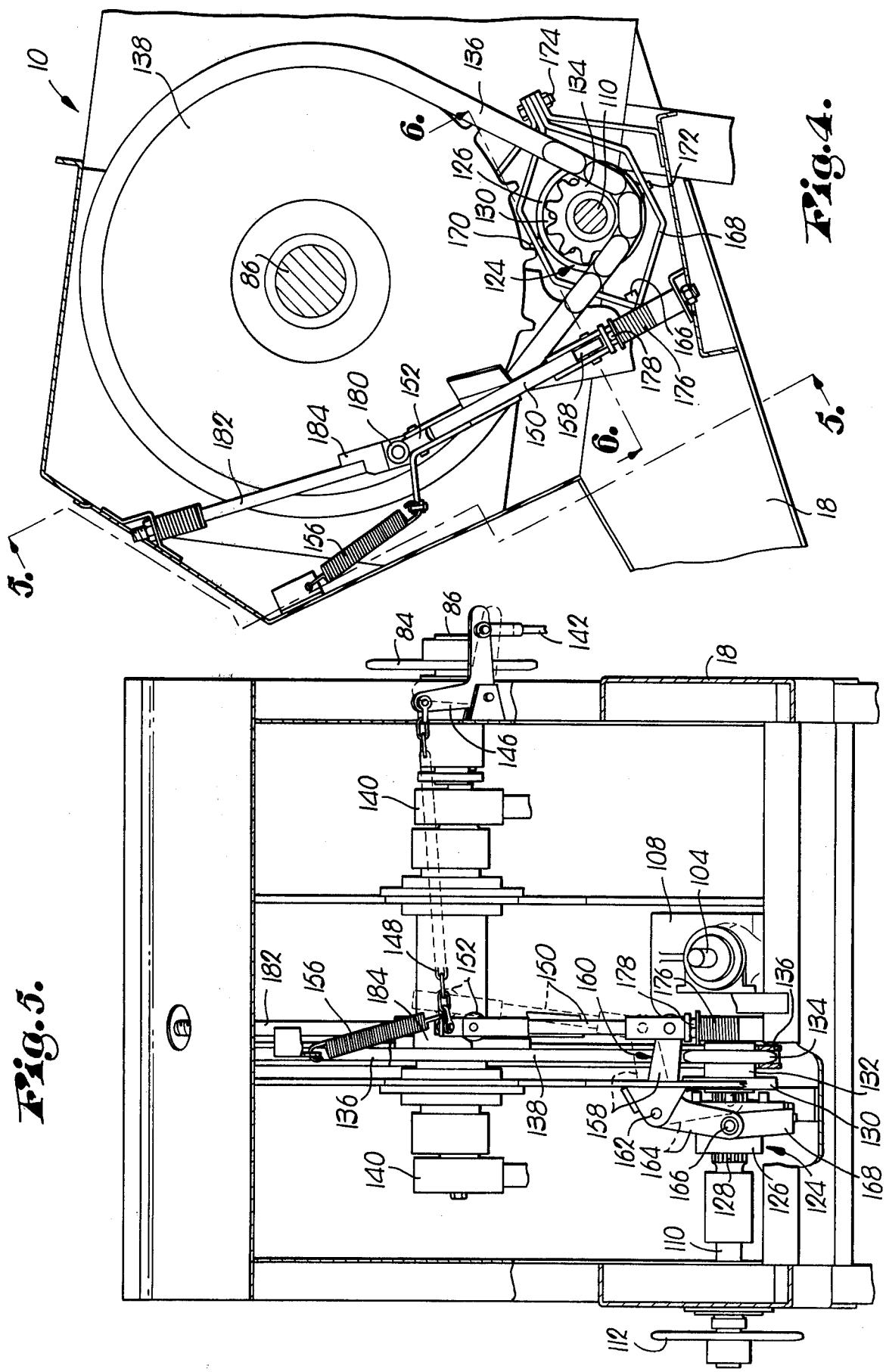

CROP DENSITY SENSING MECHANISM FOR BALER LOADING APPARATUS

This invention relates to balers and, more particularly, to crop pickup balers and the manner in which crop material is loaded into the baling chambers of such machines.

While the compaction segment of a baling process is, of course, an important aspect in preparing a bale having a desired density and configuration, the loading stage of the process is perhaps even more critical to the formation of a bale having the most desirable qualities. Because crop conditions are ever-changing, and because the operator seldom has a perfectly shaped windrow to work from, e.g., the windrow may vary in width, height and may skip periodically, the plunger normally receives charges of material that can vary substantially in size and density from one time to the next. Consequently, the finished bale may have pockets of low density scattered throughout its body as well as high density areas along one side thereof, all of which can make the bale difficult to tie, hard to handle, and virtually impossible to stack.

The foregoing problems are aggravated considerably where the baler is designed to produce massive rectangular bales on the order of one ton or more as compared to the conventional 60 to 90-pound bales typically produced by contemporary equipment. Inasmuch as conventional mowing and conditioning equipment is designed to produce windrows which are suited for conventional balers having small capacity baling chambers, their small windrows are simply over-matched by the massive baling chamber of a machine which is capable of making a one-ton bale. The baling chamber becomes starved for material and, as a result, a bale having the desired density and configuration simply cannot be produced using solely small baling techniques.

One effort to resolve the problem is illustrated in U.S. Pat. No. 3,552,109, issued to P. A. M. Murray, et al, on Jan. 5, 1971. The large baler in that patent utilizes the concept of loading a series of small wads into the baling chamber across the face of the plunger instead of attempting to insert a single large charge that would occupy the entire cross-sectional area of the chamber between the plunger and the preceding material. As a consequence, however, the finished bale is of relatively low density and lacks the cohesiveness and integrity that are desirable in a dense, high-quality crop bale.

It has now been found that the baling chamber can be assured of receiving a material charge of precisely the same size and density time-after-time, regardless of varying crop conditions and windrow characteristics, if a special loading technique is employed in which the next charge is accumulated and pre-compressed outside the baling chamber until the desired size and density are obtained. Only then is the entire perfectly formed charge stuffed into the baling chamber in front of the retracted plunger for subsequent compaction.

In carrying out this technique at an operating speed which makes it practical for a high-volume operation, it is most desirable to control the loading, stuffing and compacting operations automatically so that the operator need only concentrate on keeping the machine running at the appropriate speed and properly aligned with the crop windrow. However, achieving this type of automatic operation is a difficult task for many reasons, not the least of which involves such variables as moisture content, coefficients of friction and, of course, the inherent susceptibility of systems and components to mechanical failures.

In the present loading technique the materials, such as windrowed hay, are continuously fed into the lower end of an upwardly curved duct which leads to an inlet in the floor of the bale case. The plunger reciprocating in the bale case moves across the inlet during its compression stroke and thereby serves to close off the top of the duct. Therefore, the crop which continues to be loaded into the duct at its lower end becomes pre-compressed since it can go nowhere but against the plunger overlying the top of the duct. If the charge which accumulates in the duct reaches the desired size and density by the time the plunger has completed its compaction stroke, then the plunger retracts to uncover the inlet and a stuffing fork is actuated to quickly stuff the pre-formed charge up into the baling chamber. On the other hand, if the charge being accumulated has not reached the desired characteristics, the plunger is deactivated in its duct covering position, as is the stuffing fork, until additional crop material is packed into the duct to make up for the deficient amount. Thereupon, the packing fork and plunger are activated to carry out the stuffing end compaction cycles.

In arriving at a reliable mechanism to automatically control such activation and deactivation of a plunger and stuffing fork in response to the size and density of the accumulating charge within the duct, it was initially believed that the density sensor of the mechanism must be located adjacent the top of the duct near its outlet if an accurate determination of the charge density was to be obtained. In this respect, it seemed only natural, and in keeping with established engineering principles, that the leading end of the charge, or its immediately adjacent portions, should be utilized to depress the density sensor because the leading end would most accurately reflect the density of the remainder of the charge. In fact, a number of arrangements locating the density sensor adjacent the leading end of the charge were tried, but with mixed degrees of success.

Surprisingly, and contrary to all expectations, it was subsequently discovered that when the density sensor was positioned to gauge off of the trailing end of the charge, adjacent the entry end of the duct, a much more accurate determination of the average density of the charge could be made to the end that the charges being stuffed into the bale case were of more nearly uniform density throughout, thereby ultimately producing a more uniformly dense, high-quality finished bale. Moreover, it was found that the tendency of the material to choke the duct before reaching the upper end thereof to actuate the sensor could be virtually eliminated, this proving to be highly desirable since with the duct in a choked condition and the sensor unactivated, more and more material would be crammed into the duct until finally the feeding and packing mechanism became severely damaged.

Accordingly, one important object of the present invention is to improve the quality of the finished bale and decrease the chances of mechanical failure and damage in a baler where the charge is pre-compressed to a predetermined density in a loading duct prior to stuffing the charge into the bale chamber by locating the density sensor for the charge adjacent the entry end of the duct rather than the outlet end thereof.

Another important object of this invention is to locate the sensor as aforesaid but position it in such a way that it responds to the density of the accumulating charge itself rather than to compactive forces applied by a packer used to pack the material into the entry end of the duct.

These and other important objects of the present invention will become clear or made apparent from the description and claims which follow, wherein:

FIG. 4 is an enlarged, fragmentary, elevational view of the left front side of the baler with housing structure removed to reveal details of the clutch and its associated drive mechanism;

FIG. 5 is a fragmentary, cross-sectional view of the clutch and mechanism taken substantially along line 5—5 of FIG. 4;

Figure 7:
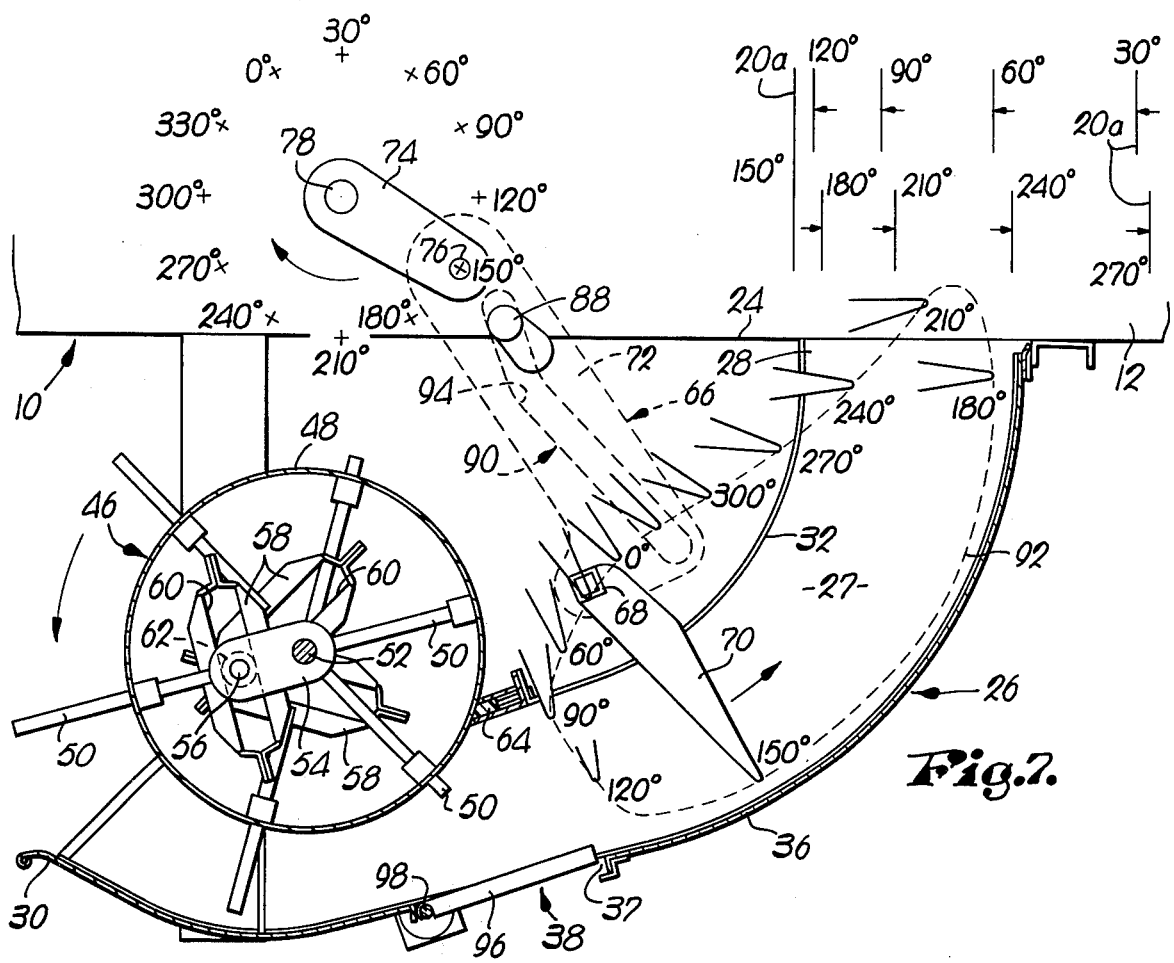
FIG. 7 is a fragmentary, vertical, cross-sectional view through the loading apparatus illustrating the position of the stuffing fork with respect to the plunger at corresponding points in the loading-compacting cycle.
Figure 8:
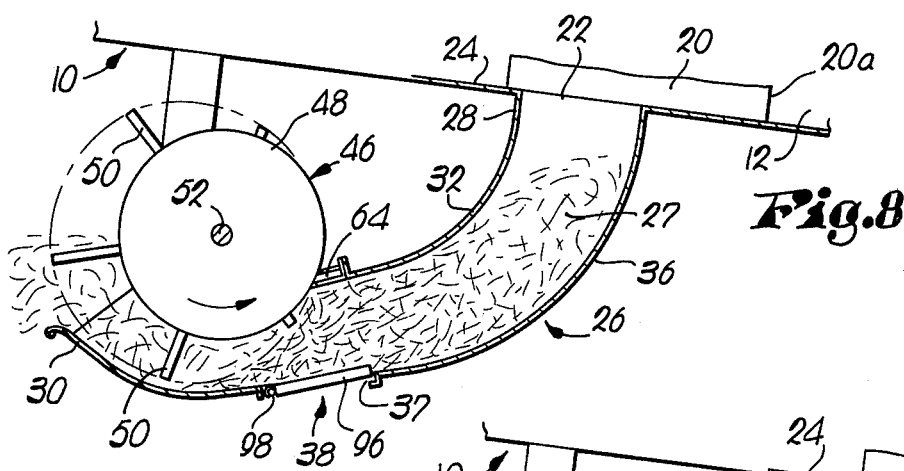
FIG. 8 is a schematic view of the loading duct and packing drum on a reduced scale illustrating the manner in which crop material is accumulated in the duct.
Figure 9:
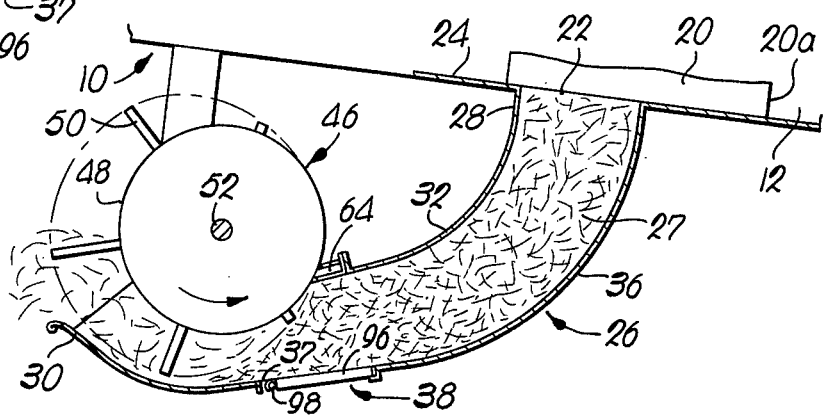
FIG. 9 is a view similar to FIG. 6, but showing the manner in which the sensing device is operated when a full charge has been packed into the duct.

The baler has a long fore-and-aft extending bale case 10 of rectangular cross section that defines a baling chamber denoted by the numeral 12 in FIGS. 7, 8 and 9. The bale case 10 is supported in a slightly upwardly and forwardly inclined manner by struts 14 having ground-engaging wheels 16 at their lowermost ends, and a downwardly and forwardly projecting tongue 18 at the front of the bale case 10 is adapted for hitching the baler to a towing vehicle (not shown) for advancing the same across a field. An enclosed plunger 20 (FIGS. 8 and 9, in particular) reciprocates fore-and-aft within chamber 12 for periodically compacting material presented to the chamber 12 through an inlet 22 in the floor 24 of bale case 10 across the full width thereof.

An upwardly curved loading duct 26 depends from the bale case 10 and has its upper discharge end 28 in registration with the inlet 22, while the lower receiving end 30 of the duct is remote from inlet 22 and is disposed substantially forwardly thereof. Duct 26 flares outwardly in a fore-and-aft direction as its upper end 28 is approached and defines a slightly wedge-shaped chamber 27. The curved top wall 32 of the duct 26 is provided with laterally spaced, longitudinal slots 34 extending the full length thereof, while the curved bottom wall 36 of the duct 26 is solid over its entire length except for a rectangular, transverse opening 37 across wall 36 adjacent the lower end 30 thereof which receives a planar sensing device 38 to be described in detail later.

The lower end 30 of the duct 26 is positioned directly behind a crop pickup 40 which may be of any design capable of picking up windrowed materials from the field and delivering the same rearwardly into the duct 26. In the illustrated embodiment, the pickup 40 has a series of lifting tines 42 that sweep the crop upwardly to an overhead auger 44 which gathers the crop centrally and delivers it rearwardly into the end 30 of the duct 26.

A rotary packer 46 is located between the pickup 40 and the duct 26 and across end 30 of the latter for making a pre-compressed charge of material within the duct 26 preparatory to loading the baling chamber 12. As shown perhaps most clearly in FIGS. 3, 7, 8 and 9, the top wall 32 of duct 26 terminates in rearwardly spaced relationship to the forward termination of the bottom wall 36, and the fore-and-aft space defined between such forward terminations is occupied by the packer 46. The latter includes a hollow drum 48 that is supported for rotation above the bottom wall 36 in the area of its upward curvature adjacent end 30, but the vertical distance between the bottom wall 36 and the periphery of the drum 48 at that location is substantially less than the corresponding dimension of the duct 26 throughout the remainder of its length to the bale case 10. Accordingly, the collecting chamber 27 of the duct 26 is constricted in the area immediately below the packer 46 which enables the rear periphery of the drum 48 to function as a backstop to prevent retrograde movement of the material being packed into chamber 27 as will subsequently become clear.

Figure 3:
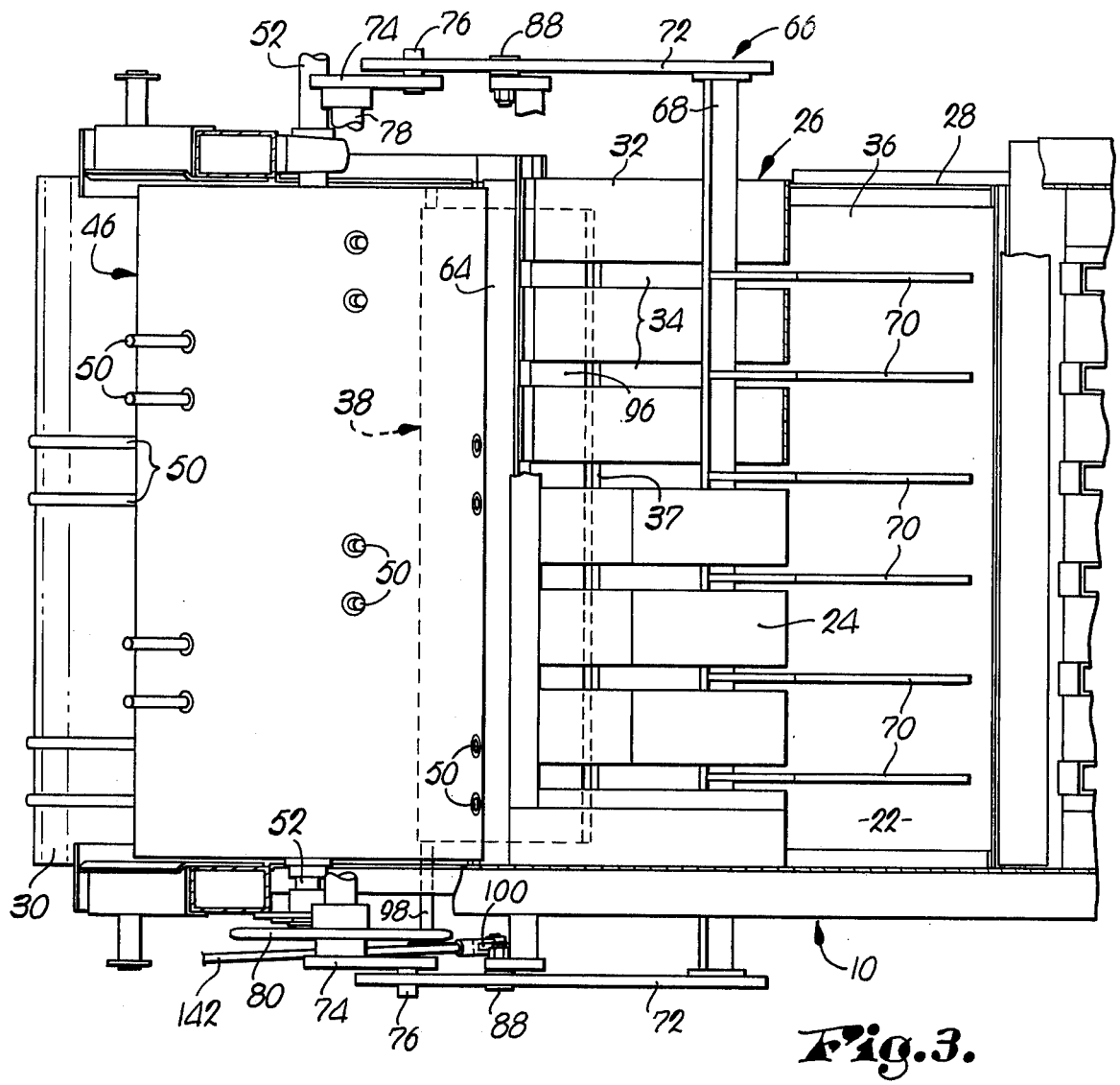
FIG. 3 is a slightly enlarged, fragmentary, essentially horizontal cross-sectional view through the loading apparatus of the baler taken just below the baling chamber.
Figure 6:
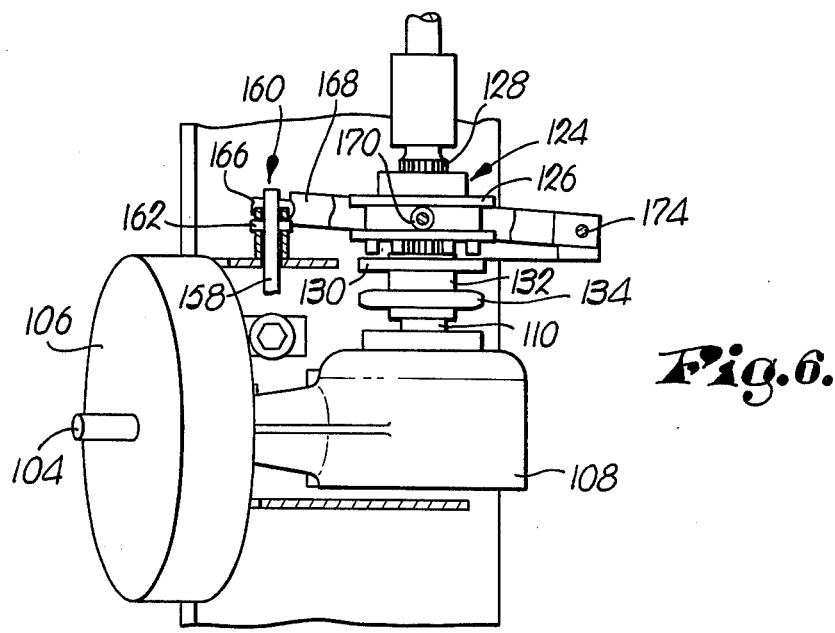
FIG. 6 is a fragmentary, cross-sectional view thereof taken substantially along line 6—6 of FIG. 4.

The packer 46 also includes a plurality of crop-engaging fingers 50 which project radially from the axis of rotation of drum 48 and are disposed about the latter in relatively closely spaced pairs as illustrated in FIG. 3. To carry out the desired packing action and yet effectively withdraw from the crop materials, the fingers 50 are mounted within the drum 48 in such a way as to be extended as the drum 48 rotates down into the crop and retracted as the drum rotates up and out of the crop past the top wall 32 of duct 26. This action per se is not new and may be accomplished using mechanism such as described in U.S. Pat. No. 2,748,921, owned by the assignee of the present invention. Briefly, for purposes of a full understanding of the present invention, suffice it to say that the mechanism for extending and retracting the fingers 50 includes a stationary shaft 52 extending the length of drum 48 in coaxial relationship therewith. A pair of stationary cranks 54 (one only being shown) at opposite ends of the shaft 52 are rigidly affixed to the latter and cooperate to support a second shaft 56 in radially spaced, parallel relationship with the shaft 52. Spaced along the shaft 56 are a number of elongated mounts 58, each of which has a longitudinal trackway 60 within which a roller 62 on shaft 56 can operate, and each of the mounts 58 carries two oppositely extending pairs of the fingers 50. Thus, when the drum 48 is rotated, the fingers 50 and mounts 58 are carried around the axis of shaft 56 which, by its eccentric relationship to the axis of rotation of the drum 48, causes the mounts 58 to move back and forth on rollers 62 and thereby retract and extend the fingers 50, respectively.

An elongated scraper blade 64, mounted on the top wall 32, extends across the full width of the duct 26 in close proximity to the periphery of drum 48 for wiping crop material which might otherwise cling to the drum 48 during its rotation past the top wall 32. Note that inasmuch as fingers 50 are fully retracted as they sweep past top wall 32, they do not interfere with the blade 64 such that a truly effective crop-stripping action is obtained at that point.

Behind the packer 46 and above the loading duct 26 is located a stuffing fork 66 for periodically sweeping an accumulated charge into the baling chamber 12 from the duct 26. The fork 66 has a transverse square tube 68 spanning the duct 26 above the latter from which a series of laterally spaced-apart, elongated tines 70 depend. The tines 70 are spaced apart in accordance with the slots 34 in the top wall 32 of duct 26 such that tines 70 may enter chamber 27 through slots 34 and move along the duct 26 toward the bale case 10 during the loading cycle.

The fork 66 also includes a pair of levers 72 at opposite ends of the tube 68 that are mirror images of one another. Each lever 72 carries the tines 70 at its lower end and is rotatably coupled with a crank 74 at its upper end through a pivot 76. The cranks 74, in turn, are rigidly affixed to opposite ends of a drive shaft 78 that spans the bale case 10 above the packer 46. Shaft 78 is, in turn, driven by a large sprocket 80 (FIG. 2) on the left side of the bale case 10 as viewed from the rear thereof, and the sprocket 80 receives driving power from an endless chain 82 entrained around a drive sprocket 84 carried by a drive shaft 86. In this manner, the normally upper or operated end of each lever 72 is mounted for movement in a circular path of travel about the axis of shaft 78.

A pair of stationary fulcrums 88 for the levers 72 extend laterally outwardly from opposite sides of the bale case 10 and are received within corresponding longitudinally extending slots 90 of the levers 72. Thus, during rotation of the upper ends of levers 72 by cranks 74, the fork 66 is operated through a generally kidney-shaped path of travel 92 into, along and out of the duct 26, as illustrated in FIG. 7. Note that the path of travel 92 extends upwardly through inlet 22 and into the baling chamber 12 for a short distance such as to assure that the charge from duct 26 is fully loaded into the chamber 12 during each loading cycle. Note also that because the levers 72 are shifted along as well as turned about the fulcrums 88 during each revolution of the cranks 72 (compare FIGS. 1 and 2 with FIG. 7), the fulcrum points for the levers 72 are displaced accordingly. Therefore, a long lever arm is presented between the pivots 76 and fulcrums 88 when the levers 72 are in the standby positions of FIGS. 1 and 2, and a short lever arm is presented between pivots 76 and fulcrums 88 when levers 72 are fully into the duct 26 as illustrated in FIG. 7. Consequently, the upsweep or stuffing stroke of the fork 66 is considerably more rapid than the initial entry and final withdrawal strokes thereof. An obliquely extending leg 94 of each slot 90 adjacent the corresponding pivot 76 has the effect of retarding the upsweep of the fork 66 during its initial entry into the duct 26.

Returning now to the sensing device 38 mounted on the bottom wall 36 of duct 26 adjacent the latter's entry end 30, such device 38 includes a single rectangular plate 96 mounted within opening 37 on a shaft 98 that spans duct 26. The shaft 98 is supported by the duct 26 for rotation about its longitudinal axis so as to swing the plate 96 into and out of the chamber 27 between the positions illustrated in FIGS. 8 and 9. An operating crank 100 fixed to the left end of shaft 98 as viewed from the rear of the machine, has a tension spring 102 (FIG. 2) connected thereto for the purpose of yieldably biasing the plate 96 into the chamber 27. The tension of spring 102 may be adjusted by means not shown for varying the force with which plate 96 is urged into its standby position within the chamber 27.

Note, as illustrated best in FIGS. 8 and 9, that the plate 96 is located slightly rearwardly of the arcuate path described by the retracting fingers 50 and that it is also slightly rearwardly of being directly beneath the drum 48. Hence, plate 96 does not receive the downward compressive force applied by drum 48 against material entering end 30.

Depression of the device 38 downwardly by the accumulated charge to its operated position as illustrated in FIG. 9 may be utilized to signal the operator that it is time to actuate the fork 66 and plunger 20. This could, of course, be accomplished in any number of ways such as by causing a light to flash, a bell to ring, or a buzzer to buzz. On the other hand, such movement on the part of the device 38 may be utilized to automatically actuate the fork 66 and the plunger 20, again through a number of suitable mechanisms. One such mechanism is illustrated in FIGS. 2, 4, 5 and 6.

A power input shaft 104 along the tongue 18 carries a flywheel 106 at the upper end of the tongue 18 immediately adjacent a right angle gearbox 108 coupled with the input shaft 104. A live transverse shaft 110 leads laterally from gearbox 108 toward the right side of the machine, where it carries a drive sprocket 112. Sprocket 112, in turn, and through an endless chain 114, drives a second sprocket 116 fixed to the shaft 52 of packer 46, thereby supplying driving power to the latter. A third sprocket 118, also fixed to the shaft 52, in turn, drives the mainshaft 120 of the pickup 40 through an endless chain 122. Thus, so long as the power input shaft 104 is rotating, the pickup 40 and the packer 46 are in constant operation.

On the other hand, the plunger 20 and the stuffer 66 are to be operated only if and when the sensing device 38 indicates that the duct 26 has received a charge having the predetermined size and density. Accordingly, the plunger 20 and the stuffer 66 share a common clutch 124, which couples the plunger 20 and stuffer 66 with the live shaft 110 when the clutch 124 is engaged, such latter condition arising only in response to the proper size and density being sensed by the device 38. The clutch 124 has a male half 126 that is carried on a longitudinally splined portion 128 of the live shaft 110 for rotation therewith but relative shifting movement therealong toward and away from the female clutch half 130. The female half 130 has as an integral part thereof a sleeve 132 that receives the live shaft 110 and enables the latter to rotate relative to the female half 130, unless the latter is engaged by the male half 126, in which event both halves (126 and 130) rotate as a unit with the live shaft 110.

The sleeve 132 fixedly carries a small sprocket 134 which is entrained by an endless chain 136 that loops upwardly around a very large sprocket 138 which is fixedly carried on the transverse shaft 86 projecting outwardly beyond the left side of the bale case 10 and carrying the sprocket 84 which ultimately drives the fork 66. Eccentrically coupled with the shaft 86 within the forward part of the machine are pitmans 140 on opposite sides of the large sprocket 138 which lead to the plunger 20 and are drivingly connected thereto in a manner not shown but well understood in the art. Thus, when the clutch 124 is engaged, the large sprocket 138 is caused to rotate which, in turn, drives the shaft 86 to operate the plunger 20 and the fork 66.

The moving force required to shift the male clutch half 126 into driving engagement with the female clutch half 130 is supplied by fore-and-aft link rod 142 along the left side of the machine which connects the operating crank 100 of the device 38 with a bell crank 146 mounted on the side of the machine near the front thereof. The obliquely disposed bell crank 146 is, in turn, connected through a pull chain 148 to the upper end of an elongated, rigid, generally upright connector 150 having a roller 152 adjacent its upper end for bearing against the proximal face of the large sprocket 138 during operation. The connector 150 is biased yieldably upwardly by a tension spring 156 at its upper end, while at its lower end, the connector 150 is pivotally coupled with the generally horizontal leg 158 of another bell crank 160, the latter being pivoted to the frame of the machine at pivot point 162. The other leg 164 of the bell crank 160 has a loose connection 166 with the forward end of a pentagonal, generally vertically disposed yoke 168 that is joined to the male clutch half 126 by upper and lower pivots 170 and 172, respectively. The yoke 168, in turn, is pivotally mounted at its rear end by a pivot 174 for transverse swinging movement along the live shaft 110 such as to thereby impart the necessary movement to the male clutch half 126 for engaging and disengaging the latter from the female clutch half 130. A spring loaded bumper 176, having a bolt head 178 as the top engaging surface thereof, is disposed below and in direct registration with the connector 150, being a separate part from the latter, as may be seen by viewing FIG. 5 wherein the bolt head 178 remains stationary while the connector 150 is lifted off of the latter to its dotted line position as the bell crank 146 pulls on chain 148.

When the connector 150 is in its solid line position of FIG. 5, its roller 52 is caught beneath a lateral projection 180 (FIG. 4) on the large sprocket 138 such as to preclude rotation of the latter in a counterclockwise direction viewing FIG. 4. However, when the sensing device 38 pulls the connector 150 upwardly and outwardly to its dotted line position of FIG. 5, the roller 152 is moved sufficiently outwardly that it can ride up and over the projection 180 when the large sprocket 138 begins to rotate counterclockwise as a result of the engagement of the clutch 124. Such outward displacement of the connector 150 is, however, made against the bias in the opposite direction of the tension spring 156. Accordingly, once the large sprocket 138 has rotated counterclockwise sufficiently far that the projection 180 clears the roller 152, the spring 156 urges the connector 150 back toward the face of sprocket 138 so as to place the roller 152 in alignment with the projection 180 as it comes around at the completion of the single revolution of the sprocket 138. The spring 156 does not, however, urge the connector 150 back down toward its original solid line position of FIG. 5, because this would, of course, disengage the clutch 124. On the contrary, the spring 156 urges the connector 150 upwardly (as well as inwardly toward the sprocket 138) such that, even though the sensor device 38 may return to its standby position and, thus, swing the bell crank 146 inwardly, the connector 150 remains fully raised to keep the clutch 124 engaged until the completion of the stuffing and compacting cycle. Only when the projection 180 reengages the top of the roller 152 after 360° rotation of the sprocket 138 is the connector 150 pushed down to its initial position (against bumper 176) to disengage the clutch 124. At this point, a depending spring-loaded dog 182 slips behind a block 184 on the face of the sprocket 138 to prevent retrograde rotation of the latter.

OPERATION

Figure 1:
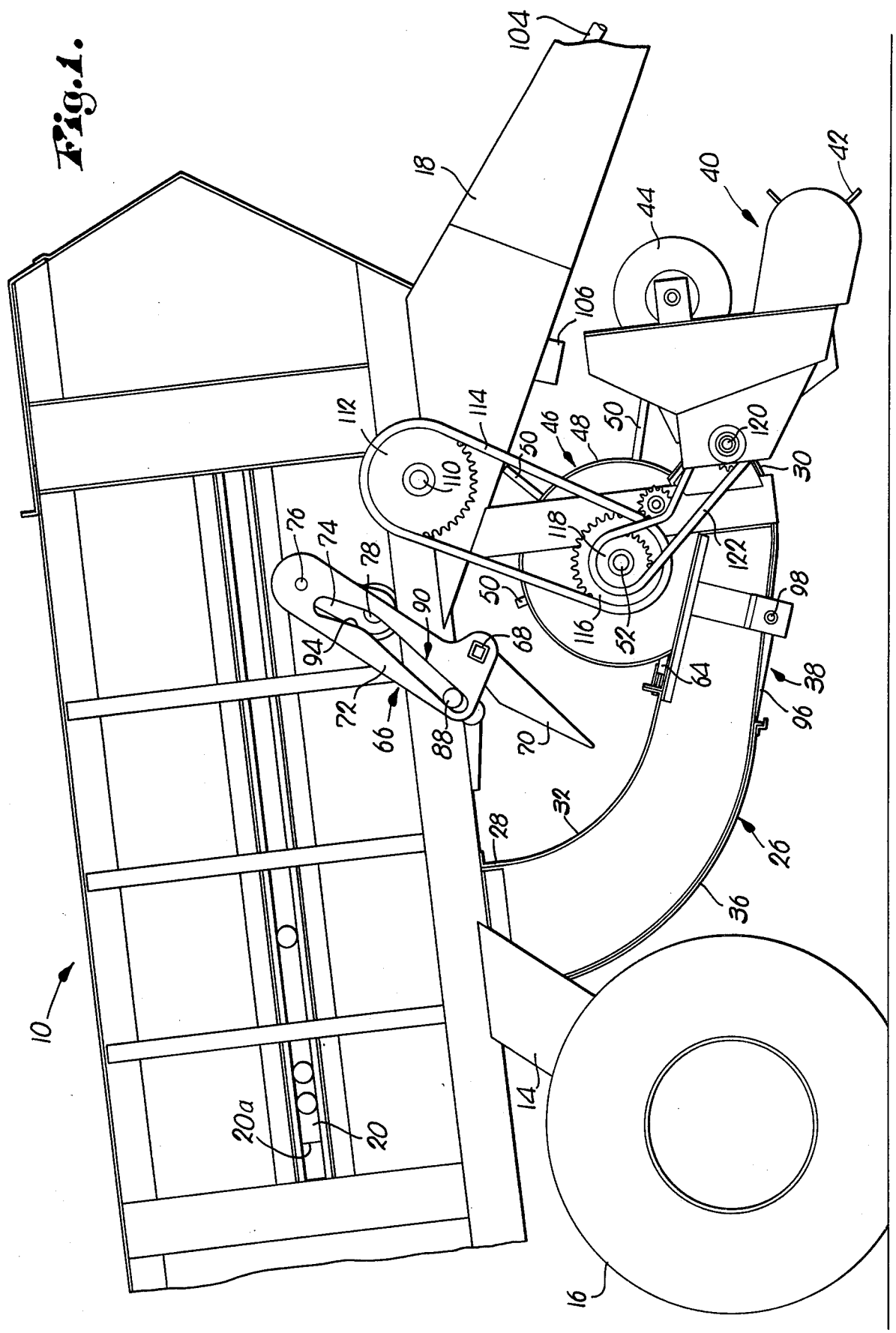
FIG. 1 is a fragmentary, side elevational view of a baler constructed in accordance with the principles of the present invention.
Figure 2:
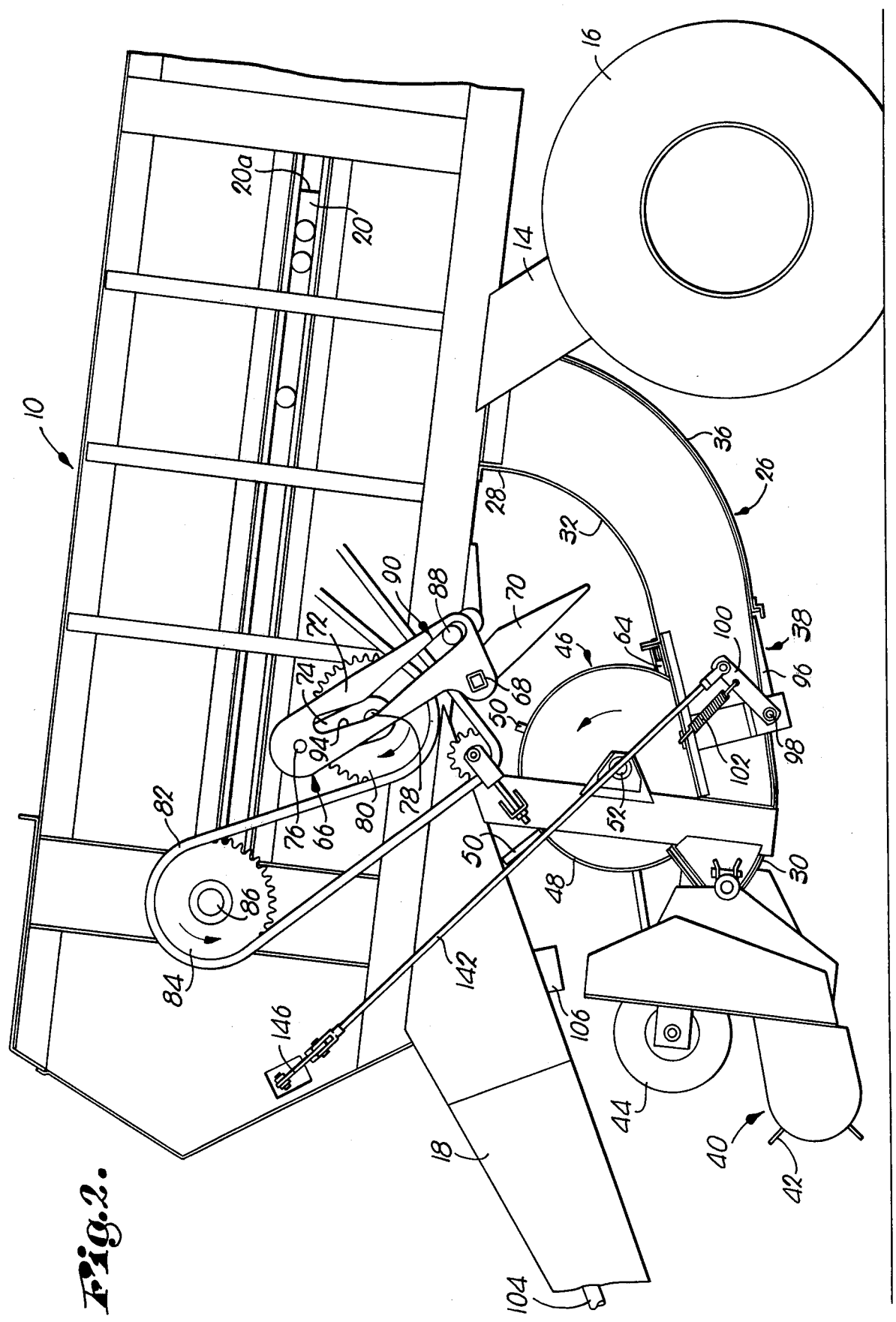
FIG. 2 is a fragmentary, elevational view of the opposite side thereof.

As the baler is advanced, the pickup 40 continuously lifts the material off the ground and delivers it rearwardly to the packer 46 and duct 26, but so long as the sensing device 38 is in its standby position within the chamber 27, the fork 66 and the plunger 20 remain idle. This condition is illustrated in FIG. 8 wherein the plunger 20 overlies the inlet 22 so as to provide a top closure to the chamber 27 at this time. The fork 66 is fully out of the duct 26 at this time in its standby position as illustrated in FIGS. 1 and 2. Consequently, as the baler continues to advance and picked up material continues to be packed into the chamber 27 by packer 46, a charge of predetermined size and density begins to accumulate within the duct 26. The material accumulating within chamber 27 cannot escape upwardly through the closed inlet 22, nor can it escape downwardly past the rotating packer 46, and, thus, the density of the accumulation and the force it exerts against the sensor plate 96 is progressively increased until the plate 96 is depressed as depicted in FIG. 9. This engages the clutch 124 in the manner above-described to activate plunger 20 and fork 66 through a single operating cycle.

The correlation of movement between the fork 66 and the plunger 20 is illustrated in FIG. 7 wherein it may be seen that during the first 120° of the operating cycle, the front face 20a of the plunger 20 retracts almost to the front edge of the inlet 22, thereby opening the latter, while the fork 66 enters the duct 26 through slots 34 and begins its upsweep toward the baling chamber 12. During the next 60° in the operating cycle (particularly the 30° between 150° and 180°), the fork 66 sweeps rapidly toward the baling chamber 12 to a point slightly below inlet 22 so as to quickly stuff the accumulated charge into the baling chamber 12 between the face 20a of plunger 20 and structure serving as a backstop for the plunger 20, such as a previous charge of material. Note during this interval that the plunger face 20a has extended only slightly from its 150° position.

As the fork 66 and the plunger 20 move from 180° to 240° in their respective cycles, the fork 66 enters baling chamber 12 for a short distance above the inlet 22 in order to assure that the charge is fully stuffed into chamber 12, the plunger face 20a (which is desirably vertically slotted) wipes the charge off the fork 66, and the latter begins its downward withdrawal stroke while the plunger face 20a continues on rearwardly across the inlet 22 to compact the charge rearwardly. During the final 120° of the operating cycle, the fork 66 returns to its standby position and the plunger 20 completes its rearward stroke, placing both components in readiness for the next stuffing and compacting sequence. Of course, the sensing device 38 is returned by spring 102 to its standby position within the accumulating chamber 27 once the fork 66 has stuffed the charge into the baling chamber 12, whereupon the device 38 is ready for the next charge.

Note that the frequency of operation of plunger 20 and fork 66 depends entirely upon how rapidly the material accumulates within duct 26. If at the completion of one cycle the next charge is ready such that sensing device 38 is in its operated position, the clutch 124 will remain engaged and the plunger 20 and fork 66 will operate non-stop. However, if the next charge has not yet reached full size, the plunger 20 and fork 66 will be temporarily deactivated.

After a number of stuffing-compacting cycles have been completed and the bale has reached the desired size, tying mechanism may be activated to bind the compressed bale. No tying mechanism is illustrated or described herein since it has no bearing on the principles of the present invention, but it is to be understood that any one of a number of suitable mechanism may be selected for use.

Positioning the sensor 38 adjacent the entry end 30 of the duct 26 instead of its discharge end 28 has proven to be of extreme significance and highly important in the production of a dense, high-quality bale of uniform density throughout. Initially, it was thought that the sensor 38 should be located near the discharge end 28 of the duct 26 in order to receive the thrust of the leading end of the charge, or at least, portions in its immediate vicinity. However, it was soon discovered that so locating the sensor 38 did not provide the anticipated degree of accuracy; in fact, it often caused the production of a charge which would have an excessive density differential between its leading and trailing ends, the leading end normally being much less dense than the trailing end. Further, it not infrequently resulted in choking of the duct 26 midway between the opposite ends 28 and 30, without such condition being sensed by the sensor 38. Consequently, the stuffer fork 66 was not actuated to remove the choked condition and the packer 46 would continue to pack additional material ever more tightly into the duct 26, thereby ultimately severely bending the fingers 50 or in other ways damaging the packer 46 and its drive train.

Somewhat reluctantly, the sensor 38 was shifted to its position adjacent the entry end 30 of the duct 26, as presently shown on the drawings, because it was anticipated that such relocation of the sensor 38 would do nothing to relieve the problem, perhaps ultimately make it worse. Surprisingly, however, quite the contrary has resulted from such relocation because the charges stuffed into the bale case were found to be of more nearly uniform density throughout, to thereby produce a more nearly uniform density bale, and the instances of mechanical breakdown or damage as a result of choking the duct 26 have been reduced to an absolute minimum.

In retrospect, it now appears plausible that the success of the entry end positioned sensor over the discharge end positioned sensor may perhaps be attributed to the fact that with the sensor at the discharge end, all of the many variables working within the duct 26 upstream from the sensor could build up and augment one another without such activity ever being detected by the sensor. For example, if the material being loaded was unexpectedly moisture-laden, such material might begin to choke the duct 26 at a point well below the sensor and, thus, go entirely unnoticed. When the leading end of the charge did reach the density required to actuate the sensor, the density at the trailing end could be much greater because of the continued action of the packer 46. It appears also that once the choking action is initiated, the density of the charge upstream from the point of choking increases very rapidly, as opposed to the density downstream from that point, consequently encouraging a large density differential between opposite ends of the charge.

On the other hand, it appears that by having the sensor 38 close to the entry end 30, the sensor 38 can immediately and without fail detect a choking condition at its inception. Before the trailing part of the charge can develop a density which is excessively greater than the leading end thereof, the sensor 38 is actuated to activate the fork 66 and the plunger 20. As a result, the charge is assured of never having a density throughout its length that is any greater than that for which the sensor 38 is preset. Since it is the trailing end of the charge which has the greatest tendency to become excessively densified, if this end is prevented from exceeding the density level permitted by the sensor 38, then the leading end must inherently be at or below the density level at which the sensor 38 becomes depressed. This, of course, also prevents damage to the packer 46 and its drive train.

While the sensor 38 is desirably located adjacent the entry end 30 of the duct 26, it is important that it be so positioned as to respond to the pressure of the accumulating charge rather than the downwardly compactive pressure applied by the packer 46 as a result of its constricted relationship with the duct 26 at entry end 30. As has previously been pointed out, because the drum 48 vertically restricts the chamber 27 at entry end 30, the material entering entry end 30 is subjected to a downwardly compactive force as it passes beneath the drum 48. Once the material has been swept under the drum 48 and is being pushed by fingers 50 up into the further reaches of the duct 26, the outward pressures exerted by the charge on the duct walls more accurately reflect the density of the charge. Consequently, the plate 96 is positioned slightly downstream from the arcuate path of the retracting fingers 50 instead of directly beneath the drum 48. The result is a charge of substantially uniform density end-to-end and time-after-time, to the ultimate end that a dense, high-quality bale of uniform density throughout may be produced.

Having thus described the invention, what is claimed as new and desired to be secured by Letters Patent is:

1. In a baler:
    a hollow bale case defining a baling chamber;
    a plunger reciprocable within said chamber,
    said case having an inlet for admitting a charge of material to the chamber for compaction by the plunger during its reciprocation;
    a loading duct leading to said inlet;
    apparatus for continuously feeding material into said duct to accumulate a charge of predetermined characteristics;
    a loader for cyclically stuffing the charge from said duct into the chamber in timed relationship to reciprocation of the plunger; and
    mechanism for temporarily deactivating the loader between cycles if a charge having said predetermined characteristics fails to accumulate in said duct during the preceding stuffing cycle,
    said duct having an entry end remote from said inlet of the bale case,
    said mechanism including a sensor adjacent said entry end and responsive to the density of the accumulating charge in said duct to control said deactivation.

2. In a baler as claimed in claim 1, wherein said apparatus includes a unit for packing the material into the duct under pressure, said unit being operable along a prescribed path of travel within said duct, said sensor being located slightly downstream from the downstream termination of said path of travel with respect to the direction of material flow through the duct.

3. In a baler as claimed in claim 1, wherein said unit includes a rotary member disposed across said entry end of the duct and having a plurality of material-engaging fingers carried thereby for rotation therewith, said fingers being disposed to sweep along, across and out of the duct during rotation of the member.

4. In a baler as claimed in claim 3, wherein said unit further includes means for retracting said fingers into the member as the fingers sweep across and out of the duct.

5. In a baler as claimed in claim 4, wherein said member is disposed to transversely constrict the duct adjacent said entry end whereby to subject material to transverse compression as it is fed into said entry end.

6. In a baler as claimed in claim 5, wherein said sensor is located slightly downstream from the construction presented by said member with respect to the direction of material flow through the duct.

7. In a baler as claimed in claim 6, wherein said sensor includes a device responsive to the laterally directed pressure of the charge as it accumulates in the duct.

8. In a baler as claimed in claim 7, wherein said duct includes a sidewall, said device being swingable on said sidewall into and out of the path of material flow through the duct.

9. In a baler as claimed in claim 8, wherein said device is planar, lying in a plane generally parallel to said path of material flow.

10. In a baler as claimed in claim 1, wherein said duct includes a sidewall, said sensor including a plate disposed in a plane generally parallel to the path of material flow through the duct, said plate being swingable on said sidewall into and out of said path of material flow.

11. In a baler as claimed in claim 10, wherein said apparatus includes a unit for packing the material into the duct under pressure, said unit being operable along a prescribed path of travel within said duct, said plate being located slightly downstream from the downstream termination of said path of travel with respect to the direction of material flow through the duct.

12. In a baler as claimed in claim 11, wherein said apparatus is provided with a source of driving power, said mechanism including a clutch operable to drivingly couple the loader and the plunger with said source of driving power when the clutch is engaged, said plate being operably coupled with the clutch for engaging the latter when the plate swings out of said path of material flow.

13. In a baler as claimed in claim 12, wherein said mechanism further includes means for maintaining said clutch engaged for a complete stuffing and compacting cycle despite the release of pressure on said plate as the charge of material is stuffed into said chamber.

14. In a baler as claimed in claim 13, wherein said bale case extends generally horizontally and said inlet is in the bottom thereof, said duct leading upwardly to said inlet from below the bale case, said entry end of the duct being lower than said inlet of the bale case.

* * * * *